May 21, 1963
T. A. CAHA
3,090,333
GROUND-WORKING APPARATUS
Filed Dec. 20, 1960
3 Sheets-Sheet 1
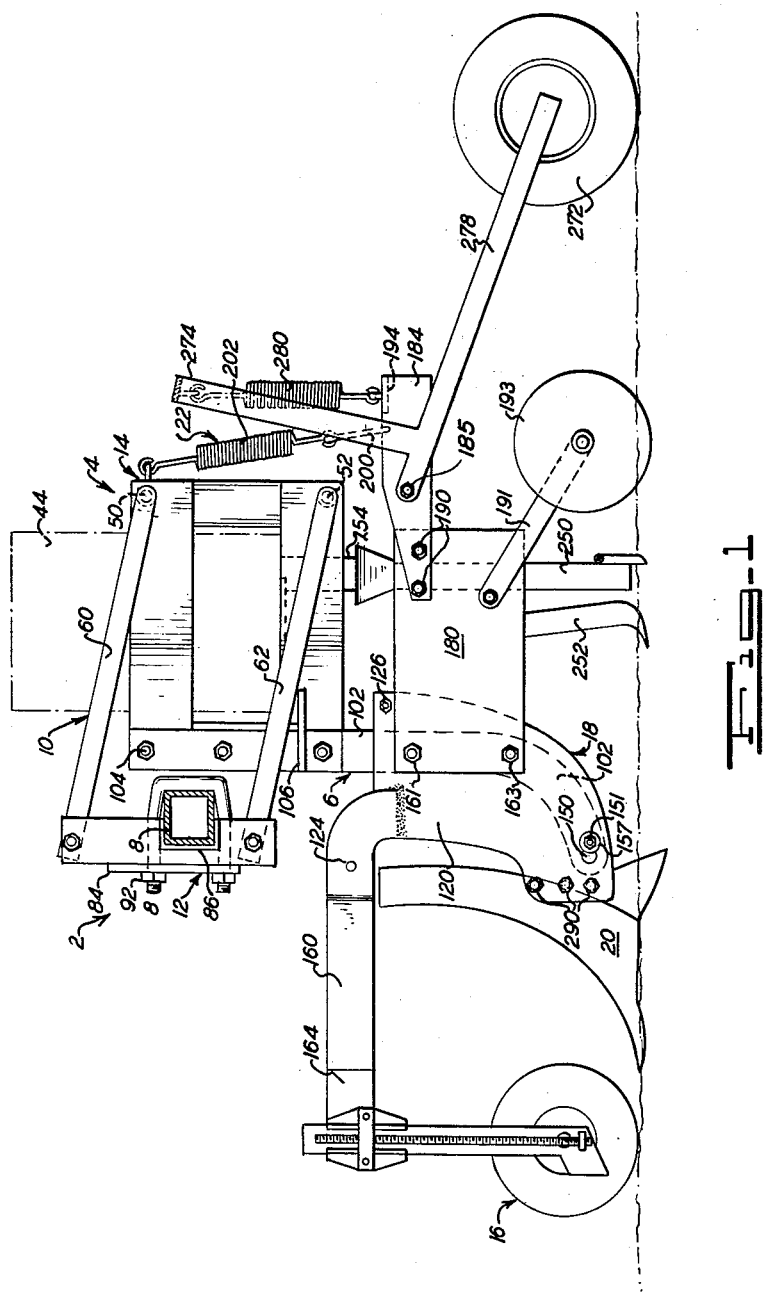
INVENTOR
THEOPHIL A. CAHA
BY
ATTORNEYS May 21, 1963 T. A. CAHA 3,090,333
GROUND-WORKING APPARATUS
Filed Dec. 20, 1960 3 Sheets-Sheet 2
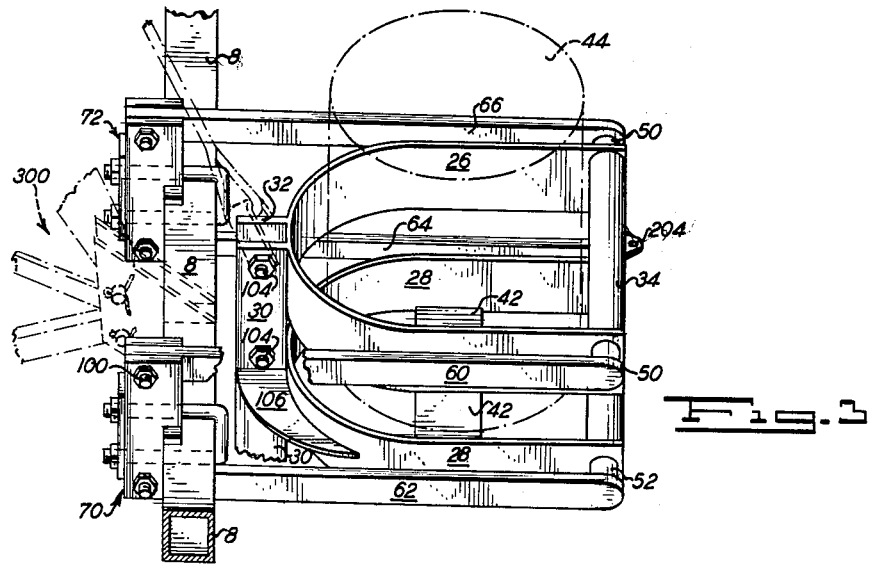
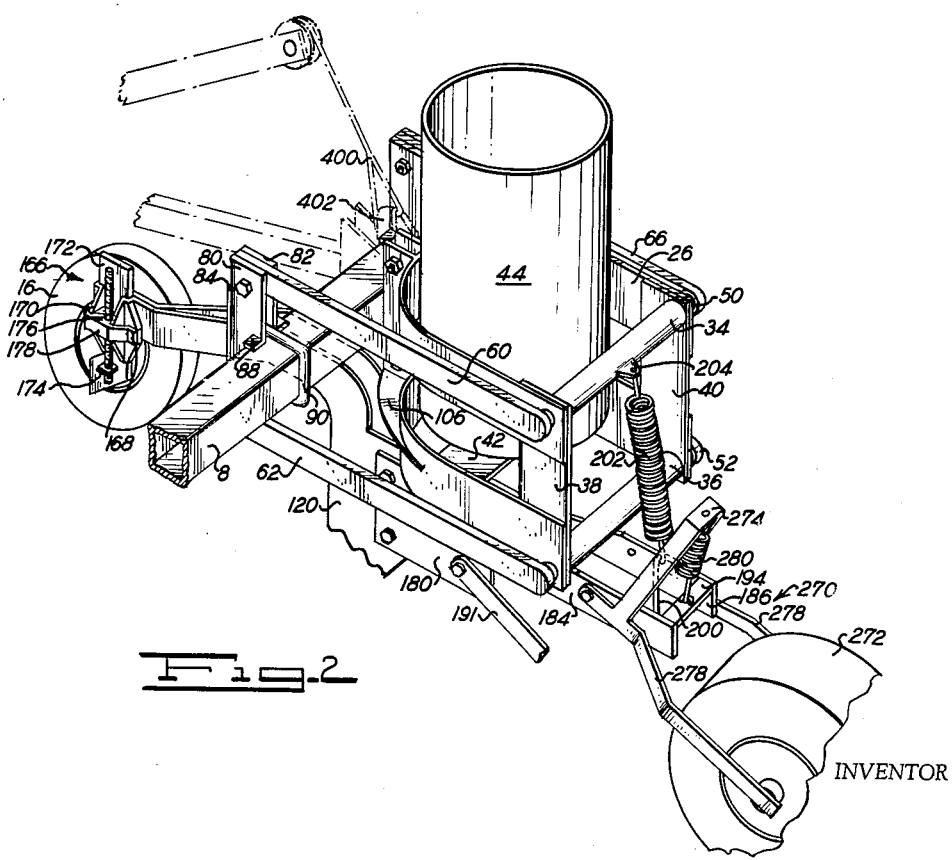
INVENTOR
THEOPHIL A. CAHA
BY Jacobi & Jacobi
ATTORNEYS

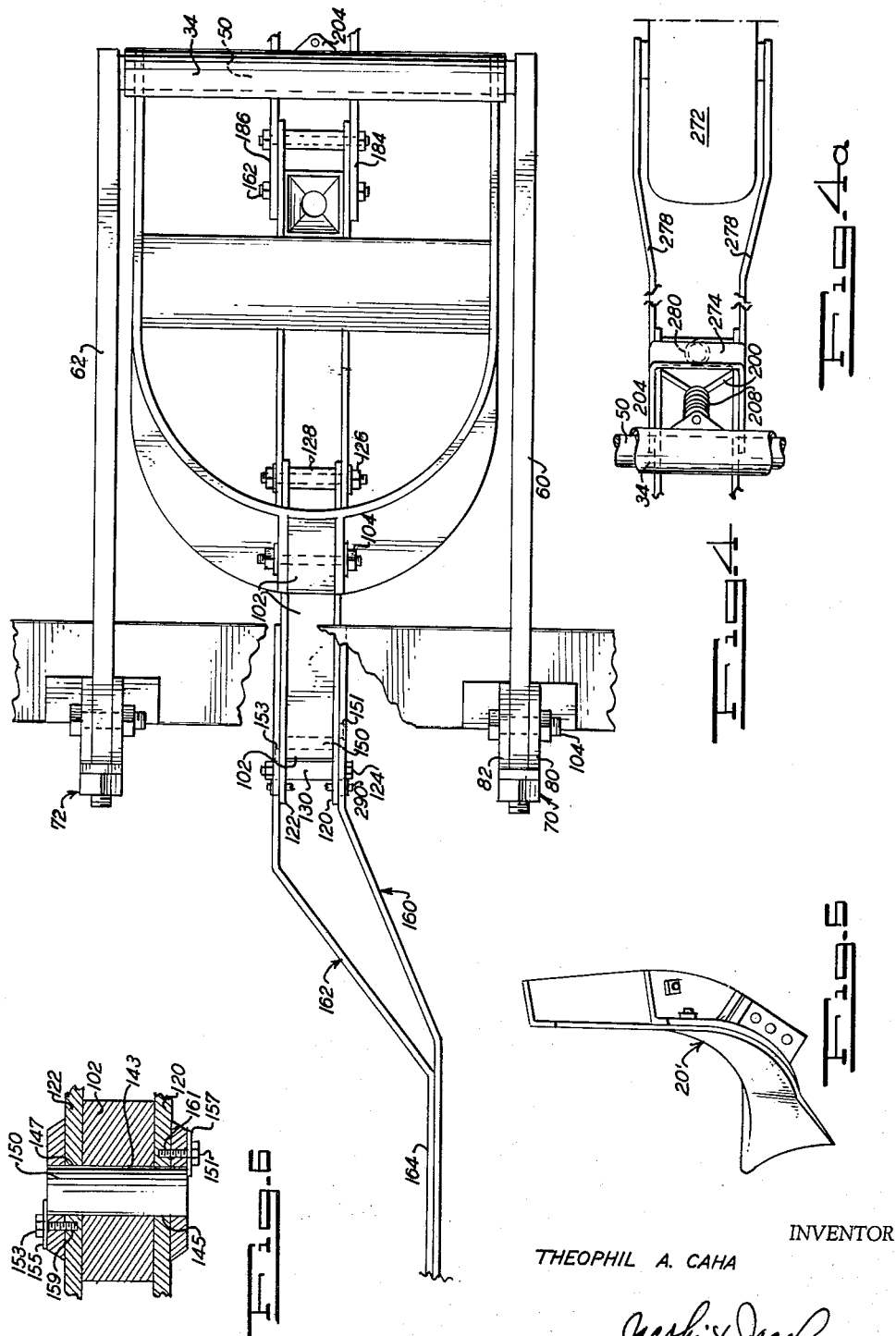

__United States Patent Office__ 3,090,333
Patented May 21, 1963

3,090,333
GROUND-WORKING APPARATUS
Theophil A. Caha, Rte. 1, Wahoo, Nebr.
Filed Dec. 20, 1960, Ser. No. 77,070
17 Claims. (Cl. 111—63)

This invention relates to ground-working apparatus, and is particularly adapted for use in connection with a ground-working tool which is to be maintained in a given position relative to a ground surface regardless of any unevenness of, or irregularities in, the land being traversed or worked by the tool.

The problem of providing means for supporting a primary ground-cutting tool whereby such tool excavates a ditch of constant depth regardless of irregularities in the surface being traversed, has long been recognized, and the instant invention is concerned with providing an efficient, compact apparatus which solves the problem. Generally, the invention incorporates a ground-engaging "control" wheel and a vertically-reciprocal frame which coact to adjust the tool cutting level.

At least one other inventor concerned with the problem has suggested a solution which provides an apparatus incorporating a ground-engaging control wheel coupled to a ground-working tool. However, in this suggested construction, the coupling is achieved through a complex linkage, and the ground-cutting tool is disposed somewhat distant from the ground-engaging wheel, so that the cutting tool cannot closely follow the irregularities in ground contour. Moreover, with such construction, draft is applied to the ground-engaging tool through a linkage extending to the forward end of the powered vehicle or tractor, and this means of applying draft has a tendency to change the pressure applied to the ground-engaging wheel which in turn tends to overcome the pressures applied thereto by irregularities in the ground so that the function of the ground-engaging wheel is, at least to a certain extent, incomplete or imperfect. Additionally, when utilizing such construction, only two rows or ditches can be simultaneously operated upon in the field. Thus, while the prior art has disclosed a device alleged to be operable under control of a ground-engaging wheel, such a device does not provide a complete solution to the "constant depth" problem.

In apparent recognition of the disadvantages heretofore existent in connection with an apparatus of the type described in the preceding paragraph, other inventors have suggested the utilization of a relatively "fixed" primary cutting tool in combination with a second adjustable cutting tool. Such constructions generally use a skid or boot which serves to raise or lower a biased arm that in turn causes the secondary cutting tool to move horizontally and vertically to compensate for surface irregularities. Constructions of this nature are more or less of a compromise in that the primary ground-engaging tool is relatively fixed and causes variations in depth of a cut or furrow, and while the secondary ground-engaging tool compensates for irregularities to a limited extent, there is no substantial compensation.

The present invention has as its primary object the provision of a compact unit controlled by a ground-engaging wheel and adapted to adjustably support a primary cutting tool and control the movements thereof in accordance with surface irregularities, which unit is free of the aforestated disadvantages and is easily attachable to a tool bar along with a plurality of other such units whereby any number of rows desired can be simultaneously worked.

Still further, important, and more specific objects of the present invention are: (a) to provide a device conforming with the preceding object and incorporating a ground-engaging "control" wheel and a movable frame which cooperate to achieve vertical movement of the ground-engaging or cutting tool in accordance with surface irregularities, and which effectively eliminate horizontal movement thereof; (b) to provide an apparatus conforming with the preceding objects which places the drag weight of the cutting tool near the tractor or power vehicle; (c) to provide such an apparatus wherein thrust is applied to the ground-working tool through a vertically reciprocally supported thrust bar to which is pivotally attached means for supporting the ground-working tool and for supporting the ground-engaging wheel, which means permits free movement of the ground-engaging wheel to in turn control positioning of the ground-working tool; (d) to provide a device or apparatus conforming with all of the preceding objects which will cause the cutting tool to work at a predetermined depth at all times irrespective of unevenness of the surface traversed, irrespective of the different textures of soil being worked, and irrespective of movement of the support means to which the device is attached, or the power vehicle or draft implement used; and (e) to provide a device or apparatus conforming with all of the preceding objects which is adapted to be used with existing tractor equipments and attachments, and easily installed thereon by one familiar with such equipments and attachments.

A still further, additional, and most important object of the present invention is to provide a compact unit, device or apparatus in accordance with all of the preceding objects, which unit, device, or apparatus is easily and inexpensively manufactured, and trouble-free in operation.

The ground-working self-adjusting apparatus provided by the invention is adapted to be attached to a support member which may take the form of a conventional horizontally-disposed tool bar supported on a wheeled frame. Generally the preferred apparatus of the invention comprises the combination of (a) frame means which preferably takes a "box-like" form, (b) thrust bar means fixed to and extending below the frame means, (c) arm means, (d) means for coupling the arm means to the support member or tool bar for pivotal movement with respect thereto, (e) means for pivotally coupling the arm means to the frame means whereby the frame means is vertically reciprocal with respect to the support member or tool bar; (f) support means pivotally coupled to the thrust bar means and supporting the ground-engaging wheel forward of the thrust bar means whereby the support means pivots about the thrust bar means, and moves vertically with the frame means in response to movement of the ground-engaging wheel over surface irregularities, (g) a ground-cutting tool fixed to the support means and movable therewith in response to movement of the ground-engaging wheel, and (h) means for normally urging the ground-engaging wheel into contact with the surface being traversed. Each of such means, in accordance with the preferred embodiments of the invention, takes a given form as described in detail hereinbelow, and is connected with other of the means to provide for compact construction, inexpensive manufacture, and trouble-free operation. However, it should be understood that various modifications can be made to the components described, or equivalents used in place thereof, without departing from the scope and spirit of the invention.

The invention lies in the construction, arrangement, and combination of the various means and components, as defined in the appended claims, and as will be apparent after considering the following detailed description of the illustrative and preferred embodiments of the invention presented in the annexed drawings, wherein:

FIGURE 1 is a side view of a self-adjusting ground-working apparatus constructed in accordance with the present invention, and having coupled thereto a seed-delivery tube, a seed-ditch secondary cutting tool, and a pair of disk covers;

FIGURE 2 is a perspective view of the apparatus shown in FIGURE 1, FIGURE 2 presenting the same without showing the lower extremity of the dependent lower components;

FIGURE 3 is an elevational view, partially broken-away, of the apparatus shown in FIGURES 1 and 2, FIGURE 3 presenting more clearly the preferred frame construction, the preferred manner in which the arm means are coupled with a tool bar, and the preferred manner in which the thrust bar is coupled with the frame means, as described below;

FIGURE 4 is a plan view of the apparatus shown in FIGURE 1, FIGURE 4 having certain components removed therefrom, and sub-FIGURE 4a presenting details of construction, as explained below;

FIGURE 5 is an elevation view of a ground-working tool or lay boot utilized with the apparatus of the invention; and FIGURE 6 is a fragmentary plan view showing the preferred form of pivotal coupling used between the support means and thrust bar means.

In the drawings the overall apparatus provided by the invention has been designated by the numeral 2; the frame means has been generally designated by the numeral 4; and the thrust bar means which is fixed to and extends below the frame means has been generally designated by the numeral 6. The means for supporting the frame means for vertical movement with respect to the tool bar, designated by the numeral 8, preferably comprises arms or arm means generally designated by the numeral 10, means generally designated by numeral 12 for coupling the arm means to the tool bar or member for pivotal movement with respect thereto, and means generally designated by numeral 14 for pivotally coupling the arm means to the frame means.

A ground-engaging wheel 16 is provided, and support means, generally designated by the numeral 18, which is pivotally coupled to the thrust bar means 6, supports the ground-engaging wheel forward of the thrust bar means whereby the support means 18 pivots about the thrust bar means 6, as explained in detail hereinbelow, and moves vertically with the frame means 4 in response to movement of the ground-engaging wheel 16 over surface irregularities. A ground-cutting tool 20, best shown in FIGURE 5, is fixed to the support means 18 and movable therewith in response to movement of the ground-engaging wheel 16, and biasing means, generally designated by numeral 22, is provided for normally urging the ground-engaging wheel into contact with the surface being traversed.

By referring in particular to FIGURES 2 and 3, it will be seen that the preferred form of frame means comprises a pair of U-shape members 26 and 28, a pair of vertically-disposed bracket plates 30 and 32 fixed to the U-shape plates at the arcuate base of each and maintaining the U-shaped plates in vertically-spaced-apart position, a pair of tubular members 34 and 36 extending horizontally between the open ends of each of the U-shaped plates, and in the embodiment shown defining the rear end of the frame means, and a pair of supports 38 and 40 extending vertically between the aligned open ends of the respective U-shape plates 26 and 28. All of the parts of the frame means are preferably welded to one another to provide a sturdy and tight construction.

The preferred form of frame means described above has spaced-apart forward and rear ends, the forward end being defined by the arcuate base of the respective U-shape members 28 and 26, and the rear end being defined by the tubular members 34 and 36, and sides defined by the spaced arms of the U-shape members 26 and 28 which extend between the forward and rear ends of the box-like frame structure. Preferably, a base plate 42 extends horizontally between opposite arms of the lower U-shape member 28 at the bottom thereof whereby the frame is adapted to receive a container such as that designated by the numeral 44. As explained below, this container may house seed or other particulate material which is to be deposited in rows being worked.

As suggested above, the frame means 4 is vertically movable with respect to the tool bar 8 and elongate pivotal arms are incorporated for this purpose. The means for pivotally coupling the arm means 10 with the frame means comprises a pair of shafts 50 and 52 (FIGURES 1 and 4) extending through each of the tubular members 34 and 36 and projecting beyond opposite ends of the tubular members and thereby the frame. Of course, suitable apertures are provided in the vertical supports 38 and 40 and in the ends of the U-shape members 26 and 28 whereby the shafts 50 and 52 can pass therethrough. The arm means 10 comprises two pairs of elongate arm members. One pair of arm members consists of the arms 60 and 62 and the other pair of arm members consists of the arms 64 and 66. These arm members, as shown, extend along the sides of the frame means 4, and are pivotally coupled with respect to the tool bar 8 by means of brackets 70 and 72, each of which brackets is fixed to the tool bar in spaced relation to the other bracket, and each of which brackets has a coupling member extending above and below the tool bar. The pairs of arm members extend preferably in parallel spaced-apart relation along the opposite sides of the frame means 4, and one arm of each pair of arm members is fixed at one end thereof to the adjacent end of one of the shafts. More specifically, by reference to FIGURE 3, it will be seen that the arm 60 is fixed at the right end as shown to the shaft 50, and the arm 66 of the other pair of arms is fixed also to the shaft 50. Arm 62 is fixed to one end of shaft 52, and arm member 64 is fixed to the other end of the same shaft for simultaneous movement therewith. With this construction, one arm member of each pair of arm members moves simultaneously with one arm member of the other pair of arm members fixed to the opposite end of the same shaft.

The brackets 70 and 72 each comprise a pair of bracket plates 80 and 82 (FIGURE 2) fixed in spaced-apart relation on the tool bar 8. Each of the bracket plates 80 and 82 is provided with a recess 86 (FIGURE 1) which is formed by severing sections of the respective plate, and bending the same outwardly to define flanges such as that designated by the numeral 88. The flanges 88 of each plate of each of the brackets meets with the tool bar to maintain the bracket plates in the desired vertical disposition. The U-bolt 90 is passed about the tool bar 8 and forwardly through suitable apertures in the plate member 84 fixed between the front edge of plates 80 and 82. The threaded ends of the U-bolt 90 receive nuts 92 whereby the plate 84 and thereby the bracket plates 80 and 82 are securely coupled with the tool bar. Each of the brackets includes an upper coupling member defined by the upper portion of the bracket plates extending above the tool bar, and a lower coupling member defined by the same bracket plates extending below the tool bar 8.

The forward or left end of each of the arms 60, 62, 64 and 66 is coupled with one of the brackets. More particularly, as shown in FIGURE 3, the arm 60 extends forwardly along the side of the frame means 4 and is coupled with the bracket 70 between the portions of the bracket plates extending above the tool bar. Such plates are provided with aligned apertures through which there is passed a pivot bolt 100. Of course, the forward, or left end, of the arm 60, as shown, is provided with a suitable aperture through which the pivot bolt can pass. Similarly, the arm 62 is coupled with the bracket 70 between the plates thereof extending below the tool bar 8. A similar coupling bolt 100 is provided and similar apertures are provided in the plates and the arm member 62.

In a like manner, arm 66 is coupled with the bracket 72 above the tool bar, and arm 64 is coupled with bracket 72 below the tool bar.

With the construction defined above, the frame means 4 is vertically movable with respect to the tool bar 8 from the position shown in FIGURE 2 to the position shown in FIGURE 1, or vice versa. While only the two positions have been shown of the frame means and the arm members, it will be understood that free vertical movement of the frame means 4 is provided by the construction outlined, and the frame means is movable from a position centered about or in line with the tool bar 8 as shown in FIGURE 2 to a position thereabove, or a position therebelow.

The thrust bar means which is incorporated in the combination apparatus of the invention, preferably comprises an elongate bar 102 having its lower end portion curved outwardly with respect to the major portion of the bar. The upper end portion, or a portion opposite the curved end portion, is fixed between the pair of vertically-disposed bracket plates 30 and 32 which are welded to the U-shape members 26 and 28 of the frame means at the arcuate base thereof. Suitable bolts 104 pass through suitable apertures in the plates 30 and 32 as well as in the thrust bar 102 to fix the same in position with the curved portion thereof maintained below the frame means and projecting toward the ground-engaging wheel 16. Arcuate horizontally-disposed rearwardly-extending flanges 106 and 108 are provided on either side of the bracket plates 32 and 30 and welded to the lower U-shape member 28 to provide additional support for the bracket plates 30 and 32.

As explained hereinabove, the support means 18 to which is attached the cutting tool 20 and the ground-engaging wheel 16 is pivotally coupled with the thrust bar 102. Such support means, as best shown in FIGURES 1 and 4, comprises a pair of plate members 120 and 122 disposed on opposite sides of the thrust bar 102 below the frame means 4. The plate members are fixed in spaced-apart relation by sleeves 128 and 130 disposed about bolts 124 and 126 extending between the plate members 122 and 120. Provided at the lower end of the thrust bar 102, and in the curved portion thereof, is a pivot shaft 150 which extends through a suitable aperture 143 in the thrust bar 102 (FIGURE 6) as well as through suitable aligned apertures 145 and 147 in the plates 120 and 122 respectively to pivotally mount the same with respect to the thrust bar. Cap screws 151 and 153 and washers 155 and 157, provided under the heads thereof, serve to maintain the pivot shaft 150 in the desired position when the screws are tightened in the apertures 159 and 161 provided in plates 120 and 122 respectively.

It will be noted from FIGURES 1 and 6 that the lower end of the plate members 120 and 122, or the ends thereof remote from the frame means, are coupled about the pivot shaft whereby the plate members are swingable on opposite sides of the bar about the pivotal coupling and that the sleeves 128 and 130 serve as stops coacting with thrust bar 102 to prevent excess movement of such bar and the plate members.

Threaded lugs such as those designated by the numerals 161 and 163 project laterally from each of the plates 120 and 122 for purposes of coupling other components with these plates. The lugs do not extend into contact with or in the plane of the thrust bar 102, but are welded in position whereby the plates 120 and 122 are freely swingable about the thrust bar 102.

A pair of arms 160 and 162 are secured at one end, i.e., the right end as shown in FIGURES 1 and 4, to the top of each of the plate members 120 and 122 respectively. The arms 160 and 162, as best shown in FIGURE 4, are bent intermediate the ends thereof to provide a projecting tongue 164 extending in offset parallel relation to the central axis between the pairs of arm members supporting the frame or the central longitudinal axis of the frame as shown. Coupled to the tongue 164, as shown best in FIGURE 2, is a means 166 for adjustably supporting the ground-engaging wheel 16. The means for adjustably supporting the ground-engaging wheel can be of any well-known type. The type shown includes a pair of guide brackets 168 and 170 adapted to extend around the ends of a vertical plate 172 which is reciprocal within recesses defined between the guide brackets. Secured to the reciprocal plate 172 or to the flange 174 extending therefrom is a screw shaft 176 that passes through a block 178 provided with a threaded bore and attached to the brackets 168 and 170. With this construction, as is well known, the wheel 16 when coupled with the vertical plate 172 by means of an axle, moves up and down upon adjustment of the screw threads 176. The particular form of adjustable wheel support forms no part of the present invention, and any well-known type may be utilized, the type shown merely being presented for exemplary purposes.

Coupled to the plates 120 and 122, and forming of the support means in the embodiments shown in the drawings, are a pair of rearwardly-extending plates 180 and 182. These plates are provided with apertures at their forward ends through which the threaded lugs 160 and 162 projecting laterally from each of the plates 120 and 122 can pass whereby nuts 161 and 163 can be fixed on the lugs to secure the plates in position. Projecting rearwardly of the plates 180 and 182, and also forming part of the support means in the embodiment shown, are two plate arm extensions 184 and 186 which are coupled by means of bolts such as those designated by numeral 190 to the respective plates 180 and 182. A suitable cross-brace 194 is coupled between the back ends of the plate arm extensions. Also coupled between the back ends of the extensions is a hook 200. This hook is adapted to receive one end of a spring 202, the other end of which is coupled with a suitable flange 204 projecting rearwardly of the top tubular member 34 and provided with a suitable recess for receiving the spring end. The spring 202 acts through the arm extensions 184 and 186 and plates 180 and 182, and through the plates 120 and 122, and arms 160 and 162, all of which form part of the support means in the embodiment shown, to maintain the ground-engaging wheel 16 in contact with the surface being traversed. The spring 202 thus is the effective resilient means which normally urges the ground-engaging wheel 16 into contact with a surface. It is to be noted that the spring 202 does not serve to maintain the back end of the frame means 4 in downward position, but instead serves to lift the lower assembly parts to which it is attached.

The plates 180 and 182 which extend rearwardly of the plates 120 and 122 preferably support a seed-chute 250 and a secondary cutting tool 252 as shown. The container 44 which may be carried in the frame is preferably provided with a spout 254 leading into the chute 250 whereby if desired seed carried in the container passes through the tube 254 and through the chute 250 onto the ground rearwardly of the secondary cutting tool 252. Attached to the plates 180 and 182 are arms 191 supporting conventional cover wheels or disks 193 which serve to cover over the seed channel which is created by secondary cutting tool 252. Also coupled to the lower assembly is a conventional auxiliary wheel 272 and auxiliary wheel frame 270. The frame 270 comprises a pair of arms coupled on opposite sides of the arm extensions 184 and 186. A U-bracket 274 extends between the arms 276 and 278 of the frame, and a spring 280 is coupled between the top of the U-bracket 274 and the cross-brace 194 extending between the arm extensions 184 and 186. With this conventional auxiliary frame construction the spring 280 serves to maintain the wheel 272 in ground-engaging position. The coupling of the arms 276 and 278 with the extensions 184 and 186 is by means of pivot bolts 185 whereby the wheel 272 is free to move in the vertical direction, but as stated, the spring 280 serves to maintain the same in contact with the ground.

While hereinabove I have merely described the ground-cutting tool 20 in a general manner, it is to be understood that the same can comprise or take the form of a conventional lay boot, which is modified only by providing suitable coupling apertures thereon for attachment by means of the bolts 290 with the support means or support plates 120 and 122. FIGURE 5 presents a modified boot adapted to be used with the apparatus of the invention.

From the foregoing discussion it should be apparent that the construction provided is free for movement in the vertical direction without swinging of the ground-cutting tool 20 rearwardly to any substantial extent, and that the ground-engaging wheel 16 is free for movement to adjust the ground-cutting tool and the frame means. Moreover, it should be apparent that the ground-cutting tool is disposed closely adjacent the ground-engaging wheel 16 whereby positive compensation is provided for irregularities in the surface. Additionally, it should be apparent that the draft is applied adjacent the lower end of the boot or cutting tool by means of the thrust bar 102 and coupling therewith of the plates 120 and 122, and that the device is very compact and easily adapted for use on an ordinary tool bar. As many devices can be attached to the tool bar as desired, and spaced apart whereby a plurality of rows can be simultaneously tilled and seed deposited therein, and with the assurance that the depth of the seed in each row will be constant regardless of irregularities in the surface. Loosing of the nuts 92 on U-bolts 90 allows for readjusted spacing between units as desired.

For purposes of completeness, there is shown in FIGURE 3 an attachment means generally designated by the numeral 300 which comprises part of a conventional coupling used on tool bars as suggested above. The tool bar preferably is mounted or supported on wheels and pulled directly behind the tractor; however, the invention can be used with a tool bar attached directly to the tractor if desired.

It is important to understand that the preferred embodiment of the invention contemplates welding of the tubular members 34 and 36 in their position between the U-shape members 26 and 28, and welding of all other frame components together. With this construction, and by utilizing the shafts 50 and 52 extending through the tubular members 34 and 36, twisting motion of the frame means 4 is prevented.

In operation, the apparatus can be raised from operative position, or lowered thereto by a suitable cable such as that designated by numeral 400 which extends from a conventional tractor winch and connects with a hook 402 fixed to the bracket plates 30 and 32 on the front of the frame means 4. Of course, the ground-engaging wheel can be adjusted as desired, and various accessories other than those shown can be used with the apparatus.

After reading the foregoing detailed description of the preferred and illustrative embodiments of the present invention, various modifications may occur to those of ordinary skill in the art, which do not depart from the scope and spirit of the invention. Accordingly,

What is claimed is:

1. In a self-adjusting ground-working apparatus adapted to be attached to a support member, the combination comprising a frame means, a thrust bar means fixed to and extending below said frame means, arm means, means for coupling said arm means to the member for vertical pivotal movement with respect thereto; means for pivotally coupling said arm means to said frame means for vertical pivotal movement with respect thereto; said thrust bar means being disposed between the member and the pivotal connection of said arm means with said frame means whereby said frame means and said thrust bar means are reciprocal with respect to the member; a ground-engaging wheel; and support means pivotally coupled to said thrust bar means and supporting said ground-engaging wheel forward of the thrust bar whereby said support means pivots about said thrust bar means, and moves vertically with said frame means in response to movement of said ground-engaging wheel over surface irregularities, said support means having means adapted to support a ground-cutting tool for movement therewith in response to movement of said ground-engaging wheel and means cooperating between said frame and said support means for urging said support means to pivot about said thrust bar means in a direction to maintain said ground engaging wheel in engagement with a surface being traversed.

2. The combination defined in claim 1 wherein said thrust bar means comprises an elongate bar having one end portion thereof curved outwardly with respect to the major portion thereof, wherein the end portion of said bar opposite said one end portion is fixed to said frame means to maintain said curved end portion below said frame means and projecting toward said ground-engaging wheel; wherein said support means comprises at least one plate member adapted to carry said cutting tool, said plate being pivotally connected to the lower and curved end portion of said elongate bar; and an arm member coupled to and extending forwardly of the top of said plate member and wherein said combination further includes means carried by said arm member for adjustably supporting said ground-engaging wheel forward of said cutting tool.

3. The combination defined in claim 2 wherein said means cooperating between said frame means and said support means comprises a spring connected between said frame means and said support means for normally urging said plate and said arm member about the pivotal connection of said plate with said elongate bar to maintain said ground-engaging wheel in contact with a surface being traversed.

4. The combination defined in claim 1; wherein said frame means has spaced-apart forward and rear ends with sides extending therebetween wherein said thrust bar means is fixed to the forward end of said frame means, and wherein said arm means comprise horizontally spaced-apart elongate arms extending forward of said forward end and parallel to said sides, said arms being pivotally coupled to said frame means at spaced-apart locations at the rear end thereof.

5. Apparatus for simultaneously tilling several rows comprising a plurality of self-adjusting ground-working devices adapted to be attached in spaced-apart relation to a tool bar extending across the rear of a powered vehicle, each of said devices comprising in combination a frame means, a thrust bar means fixed to and extending below said frame means, arm means, means for coupling said arm means to the tool bar for vertical pivotal movement with respect thereto, means for coupling said arm means to said frame means for vertical pivotal movement with respect thereto, said thrust bar means being disposed between the tool bar and the pivotal connection of said arm means with said frame means whereby said frame means and said thrust bar means are reciprocal with respect to the longitudinal axis of the tool bar; a ground-engaging wheel; support means pivotally coupled to said thrust bar means and supporting said ground-engaging wheel forward of the thrust bar whereby said support means pivots about said thrust bar means, and moves vertically with said frame means in response to movement of said ground-engaging wheel over surface irregularities; a ground-cutting tool fixed to said support means and movable therewith in response to movement of said ground-engaging wheel, and means cooperating between said frame means and support means for normally urging said support means to a position maintaining said ground-engaging wheel in contact with a surface being traversed.

6. Apparatus for simultaneously tilling a plurality of rows as defined in claim 5 wherein said thrust bar means comprises an elongate bar having one end portion thereof curved outwardly with respect to the major portion thereof, wherein the end portion of said bar opposite said one end portion is fixed to said frame means to maintain said curved end portion below said frame means and projecting toward said ground-engaging wheel; wherein said support means comprises at least one plate member adapted to carry said cutting tool, said plate being pivotally connected to the lower and curved end portion of said elongate bar; and an arm member extending forwardly of the top of said plate member and wherein said means for normally urging said support means includes a spring member coupled between said plate and said frame for normally urging said plate and said arm member about the pivotal connection of said plate with said elongate bar.

7. Apparatus for tilling a plurality of rows as defined in claim 6 wherein said frame means has spaced-apart forward and rear ends with sides extending therebetween wherein said thrust bar means is fixed to the forward end of said frame means and wherein said arm means comprise horizontally spaced-apart elongate arms extending parallel to said sides and to said tool bar, said arms being pivotally coupled to said frame means at spaced-apart locations at the rear end thereof.

8. A self-adjusting ground-working apparatus adapted to be attached to a tool bar extending across the rear of a powered vehicle and movable therewith, said apparatus comprising a frame means; thrust bar means fixed to and extending below said frame means; arm means; means coupling said arm means to the tool bar for vertical pivotal movement with respect thereto; means for coupling said arm means to said frame means for vertical pivotal movement with respect thereto, said thrust bar means being disposed between the tool bar and the pivotal connection of said arm means with said frame means whereby said frame means and said thrust bar means are reciprocal with respect to the longitudinal axis of the tool bar; a ground-engaging wheel; support means pivotally coupled to said thrust bar means and supporting said ground-engaging wheel in spaced relation to the thrust bar means whereby said support means pivots about said thrust bar means and moves vertically with said frame means in response to movement of said ground-engaging wheel over surface irregularities; a ground-cutting tool fixed to said support means and movable therewith in response to movements of said ground-engaging wheel over surface irregularities and means cooperating between said frame means and said support means for urging said support means to pivot about said thrust bar means in a direction to maintain said ground engaging wheel in engagement with a surface being traversed.

9. A self-adjusting ground-working apparatus as defined in claim 8 wherein said frame means comprises a pair of U-shape members; a pair of vertically-disposed plates fixed to said U-shape plates at the arcuate base of each and maintaining said U-shape plates in vertically-spaced-apart position; a pair of tubular members extending horizontally between the open ends of each of said U-shape plates, and a pair of supports extending vertically between aligned open ends of respective of said U-shape plates.

10. A self-adjusting ground-working apparatus as defined in claim 9 wherein said means for pivotally coupling said arm means to said frame means comprises a pair of shafts extending through each of said tubular members and projecting beyond opposite sides of said frame means; wherein said arm means comprises two pairs of elongate arm members; wherein said means for pivotally coupling said arm means to said tool bar comprises a pair of brackets fixed in spaced-apart relation to said tool bar, each of said brackets having a coupling member extending above and below said tool bar; and wherein said pairs of arm members extend in spaced-apart relation along opposite sides of said frame means, one arm of each pair of arm members being fixed at one end thereof to the adjacent end of one of said shafts whereby one arm member of each pair of arm members moves simultaneously with one arm member of the other pair of arm members fixed to the opposite end of the same shaft, the arm members attached at one end to one of said shafts being pivotally secured at the other ends thereof to respective of said coupling members extending above the tool bar, and the arm members attached at one end to the other of said shafts being pivotally secured at the other end thereof to respective of said coupling members below the tool bar whereby said frame means is reciprocally movable between said pairs of arms extending along opposite sides thereof.

11. A self-adjusting ground-working apparatus as defined in claim 10 wherein said thrust bar means comprises an elongate bar having one end portion thereof curved outwardly with respect to the major portion thereof, and wherein the end portion of said bar opposite said one end portion is fixed between said pair of vertically-disposed bracket plates to maintain said curved end portion below said frame means and projecting toward said ground-engaging wheel.

12. A self-adjusting ground-working apparatus as defined in claim 11 wherein said support means comprises a pair of plate members disposed on opposite sides of said thrust bar below said frame, said plate members being fixed in spaced-apart relation, and pivotally coupled at the end thereof remote from said frame means with said bar whereby said plate members are swingable on opposite sides of said bar about the pivotal coupling thereof with said bar; a pair of arms, secured at one end to the top of each of said plate members and extending forwardly thereof, said arms being bent intermediate the ends thereof to provide a projecting tongue extending in off-set parallel relation to the central axis between said arm members; and means coupled with said tongue for adjustably supporting said ground-engaging wheel.

13. A self-adjusting ground-working apparatus as defined in claim 8 wherein said means for urging said support means includes spring resilient means connected between said frame means and said support means for normally urging said ground-engaging wheel into contact with a surface being traversed.

14. A self-adjusting ground-working apparatus as defined in claim 13 wherein said frame means is elongate, wherein said thrust bar means comprises an elongate member fixed on the forward portion of said frame means, wherein said arm means comprises pairs of elongate arms extending along opposite sides of said frame means, said arms being pivotally coupled at one end to the rear portion of said frame means, the arms of each pair being coupled at the other end thereof for pivotal movement with respect to the tool bar.

15. A self-adjusting ground-working apparatus as defined in claim 14 wherein said thrust bar means comprises an elongate bar having one end portion thereof curved outwardly with respect to the major portion thereof, and wherein the end portion of said bar opposite said one end portion is fixed on the forward portion of said frame means; and wherein said support means comprises at least one plate member adapted to carry said cutting tool, and an arm member extending forwardly of the top of said plate member, said plate being pivotally connected to the lower and curved end portion of said elongate bar and means coupled to said arm member for supporting said ground engaging wheel in depending relation thereto.

16. A self-adjusting ground-working apparatus as defined in claim 9 wherein said frame means comprises sides and ends, wherein a pair of tubular members extend in parallel relation across one of said ends and said thrust bar means is disposed adjacent the other of said ends, and wherein said means for pivotally coupling said arm means to said frame means comprises a pair of shafts extending through each of said tubular members and projecting beyond opposite sides of said frame means; wherein said arm means comprises two pairs of elongate arm members; wherein said means for pivotally coupling said arm means to said tool bar comprises a pair of brackets fixed in spaced-apart relation to said tool bar, each of said brackets having a coupling member extending above and below said tool bar; and wherein said pairs of arm members extend in spaced-apart relation along opposite sides of said frame means, one arm of each pair of arm members being fixed at one end thereof to the adjacent end of one of said shafts whereby one arm member of each pair of arm members moves simultaneously with one arm member of the other pair of arm members fixed to the opposite end of the same shaft, the arm members attached at one end to one of said shafts being pivotally secured at the other ends thereof to respective of said coupling members extending above the tool bar, and the arm members attached at one end to the other of said shafts being pivotally secured at the other ends thereof to respective of said coupling members below the tool bar whereby said frame means is reciprocally movable between said pairs of arms extending along opposite sides thereof.

17. A self-adjusting ground-working apparatus adapted to be attached to a tool bar extending across the rear of a powered vehicle and movable therewith, said apparatus comprising a frame means; a thrust bar means fixed to and extending below said frame means; arm means; means for coupling said arm means to the tool bar for vertical pivotal movement with respect thereto; means for coupling said arm means to said frame means for vertical pivotal movement with respect thereto, said thrust bar means being disposed between the tool bar and the pivotal connection of said arm means with said frame means whereby said frame means and said thrust bar means are reciprocal with respect to the longitudinal axis of the tool bar; a ground-engaging wheel; support means pivotally coupled to said thrust bar means and supporting said ground-engaging wheel forward of the thrust bar whereby said support means pivots about said thrust bar means, and moves vertically with said frame means in response to movement of said ground-engaging wheel over surface irregularities; a ditch-cutting tool fixed to said support means and movable therewith in response to movement of said ground-engaging wheel; means cooperating between said frame means and said support means for normally urging said ground-engaging wheel into contact with a surface being traversed; means carried by said support for depositing seed behind said ditch tool; and means coupled with said support for covering a ditch cut by said tool and into which seed has been deposited.

References Cited in the file of this patent

UNITED STATES PATENTS

| | | |
|---|---|---|
| 2,024,778 | Ray | Dec. 17, 1935 |
| 2,249,874 | White | July 22, 1941 |
| 2,269,987 | Raney | Jan. 13, 1942 |
| 2,416,189 | McIntyre | Feb. 18, 1947 |
| 2,629,351 | Wenger | Feb. 24, 1953 |
| 2,738,969 | Morris | Mar. 20, 1956 |
| 2,963,998 | Bliss | Dec. 13, 1960 |
| 2,981,213 | O'Neal | Apr. 25, 1961 |
| 3,049,181 | Oerman | Aug. 14, 1962 |

FOREIGN PATENTS

| | | |
|---|---|---|
| 1,162,706 | France | Apr. 14, 1958 |
| 464,988 | Germany | Sept. 1, 1928 |
| 484,200 | Germany | Oct. 10, 1929 |
| 1,016,044 | Germany | Sept. 19, 1957 |